(12) United States Patent
Nepela et al.

(10) Patent No.: US 6,330,131 B1
(45) Date of Patent: Dec. 11, 2001

(54) REDUCED STICTION AIR BEARING SLIDER

(75) Inventors: Daniel A. Nepela, San Jose; Paul H. Schmidt, Fremont, both of CA (US)

(73) Assignee: Read-Rite Corporation, Milpitas, CA (US)

( * ) Notice: Subject to any disclaimer, the term of this patent is extended or adjusted under 35 U.S.C. 154(b) by 0 days.

(21) Appl. No.: 08/121,876

(22) Filed: Sep. 17, 1993

(51) Int. Cl.$^7$ ............................................. G11B 17/32
(52) U.S. Cl. ............................................. 360/234.5
(58) Field of Search .................. 360/103, 104, 360/235.1, 234.5, 234.6, 234.7

(56) References Cited

U.S. PATENT DOCUMENTS

| | | | |
|---|---|---|---|
| 5,079,657 | * | 1/1992 | Aronoff et al. ............ 360/103 |
| 5,175,658 | * | 12/1992 | Chang et al. ............ 360/103 |
| 5,267,109 | * | 11/1993 | Chapin et al. ............ 360/103 |
| 5,323,282 | * | 6/1994 | Kanai et al. ............ 360/103 |
| 5,345,353 | * | 9/1994 | Krantz et al. ............ 360/103 |
| 5,347,412 | * | 9/1994 | Nitta et al. ............ 360/103 |

FOREIGN PATENT DOCUMENTS

| | | | |
|---|---|---|---|
| 0558983 | * | 9/1993 | (EP) ............ 360/103 |
| 4274014 | * | 9/1992 | (JP) ............ 360/103 |

\* cited by examiner

*Primary Examiner*—Allen Cao
(74) *Attorney, Agent, or Firm*—Nathan N. Kallman

(57) ABSTRACT

An air bearing slider for a magnetic head assembly is configured with taper flat outer rails and a recessed region between the rails in one embodiment of the invention, a hard wear-resistant layer is deposited over part of the rail area, with a thin residual layer over the remainder of the slider area, yielding a step in thickness near the load point. In another embodiment, the wear resistant layer appears only on the side rails. In an alternative embodiment using a tripad configuration of the air bearing surface, the hard wear-resistant layer is disposed on portions of all three pads. The invention allows control and minimization of the stiction forces between an air bearing slider and a magnetic disk, particularly during liftoff at the start of disk drive operation.

17 Claims, 2 Drawing Sheets

REDUCED STICTION AIR BEARING SLIDER

FIELD OF THE INVENTION

This invention relates to air bearing sliders used with magnetic head assemblies in disk drives.

DESCRIPTION OF THE PRIOR ART

Although the following description is directed to an air bearing slider, it should be understood that the invention is also applicable to contact or pseudo-contact type sliders.

Magnetic head assemblies that fly relative to rotating magnetic disks are used extensively in disk drives for recording or reading data. An objective for optimizing the noncontact transducing relationship between the flying head and the magnetic recording disk is to maintain a very close, constant, and stable spacing between the head slider and the disk surface. A close spacing, coupled with very narrow transducing gaps and very thin magnetic record films, allows recording of very short wavelength, high frequency signals, thereby maximizing the density and storage capacity of data recording. Constant spacing between the flying head slider and the disk surface minimizes the fluctuations in the signal amplitude, therefore optimizing signal resolution. This constant spacing must be maintained as the head slider moves between the inner and outer regions of the disk surface, therefore the effects of the change in skew on the flying height must be held to a minimum.

Air bearing sliders used in disk drives typically have a leading edge, and a trailing edge at which thin film transducers are deposited. Generally, the sliders have tapered portions at the leading edge and longitudinal rails that extend from the tapers all or part way to the trailing edge. The tapers may be shaped and of such length as to provide fast takeoff of the slider from a rest position, where it is seated in contact with the disk surface, to a flying attitude relative to the disk.

When the disk drive goes into operation and the aerodynamics of the air bearing slider cause it to lift off from the surface of an associated magnetic disk, stiction may occur and cause severe problems. For example, wear can result on the overcoat of the magnetic media or the underlying layer. Also adhesive failure mechanisms can be induced, resulting in particulate generation which can produce fretting wear and catastrophic failure of the head-to-disk interface. In addition, any change in the properties of the transducer tips can cause changes in flying height with resultant degradation of signal amplitude.

SUMMARY OF THE INVENTION

An object of this invention is to provide a magnetic head air bearing slider wherein the stiction force at the initially contacting head slider-to-disk interface is controlled and minimized.

According to this invention, a magnetic head air bearing slider is formed with two outer rails with a taper region at the leading edge. The outer rails may extend all the way to the trailing edge, or a multi-pad design may be used wherein the outer side rails extend approximately half-way to the trailing edge, and an additional centered pad at the trailing edge on which one or more transducers are deposited. In a preferred embodiment of this invention, the air bearing surface is modified with a hard, friction lowering layer of DLC (diamond-like-carbon) covering only a fraction of the air bearing surface of the slider. The DLC layer extends most or part of the way along the side rails, and may be straight, angled, or curved relative to the trailing edge. This DLC layer is formed towards the leading edge area of the side rails, and a thin residual layer covers the remaining surface of the slider. This implementation is particularly useful with magnetoresistive devices which require corrosion or smearing protection. The thin residual layer may have a zero thickness for inductive heads.

BRIEF DESCRIPTION OF THE DRAWINGS

The invention will be described in greater detail with reference to the drawing in which.

DETAILED DESCRIPTION OF THE INVENTION

Figure 1:
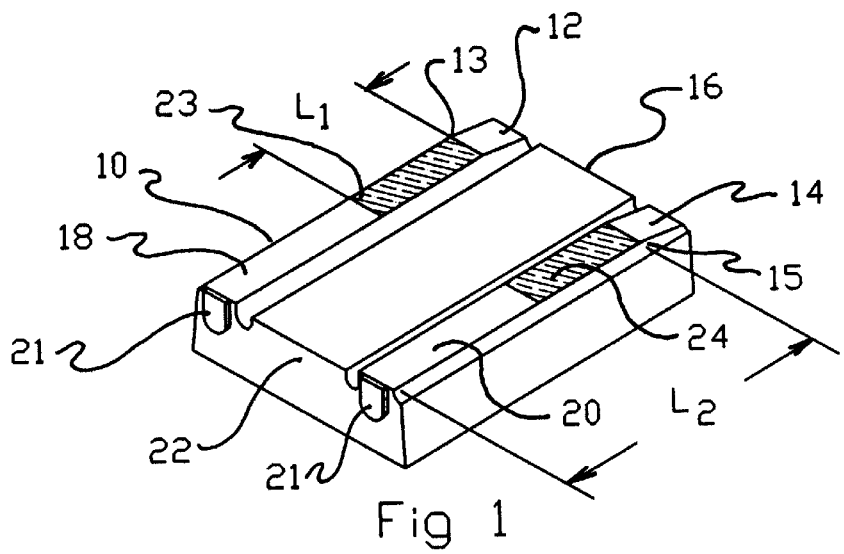
FIG. 1 is a bottom view of one embodiment of this invention, with the DLC layer extending part way down the side rails.
Figure 2:
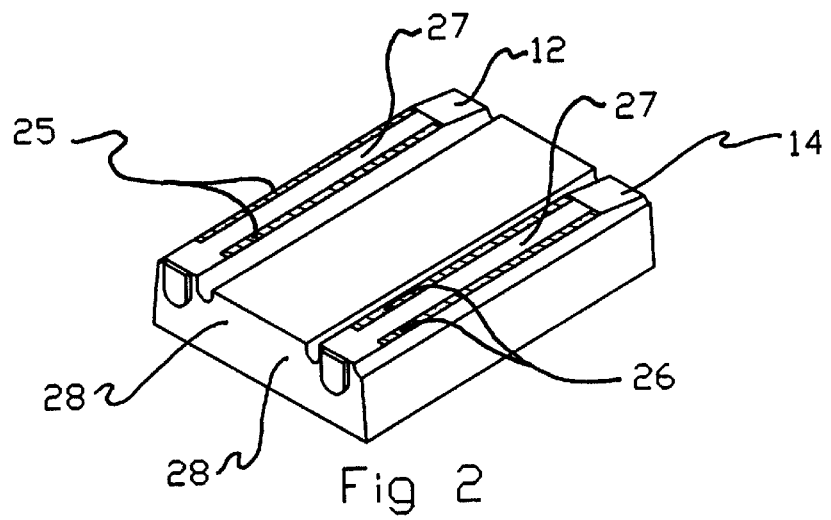
FIG. 2 is another embodiment of this invention, with the DLC layer extending at the edges of the side rails for most of the length of the side rails.
Figure 3:
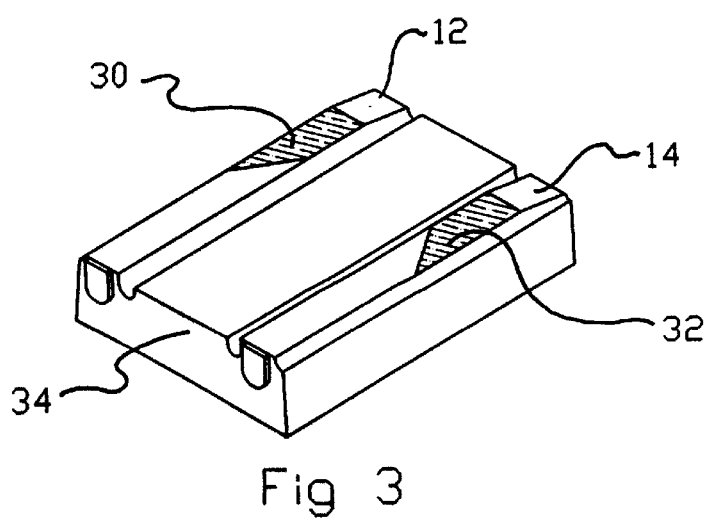
FIG. 3 is another embodiment of this invention, using a DLC layer over part of the side rails with an angled edge, as in FIG. 1.

With reference to FIGS. 1–3, an air bearing slider 10 is formed with tapered portions 12 and 14 at the leading edge 16 of the slider. The slider is generally made of a ceramic material such as silicon carbide or aluminum oxide/titanium carbide. Longitudinal rails 18 and 20 extend from the ends of the tapered portions to the trailing edge 22 of the slider. The area between the rails 18 and 20 is recessed about 0.003 inch or more, by way of example, and is formed by atomic scale etching techniques such as ion milling or conventional sawcut operations used to form the slider. Thin film transducers 21 are deposited at the ends of rails 18 and 20. The transducing gaps of the transducers are substantially flush with the air bearing surface of the slider. During operation of the disk drive, the rotation of the disk generates a thin air lubrication film opposing the applied load force on the air bearing slider, which causes the head to fly at a substantially constant height very close to the disk surface.

In accordance with this invention, the air bearing surface of the slider is modified by being partially covered with a hard friction-lowering thin film layer, which is in the range of about 500 to 3000 Angstroms thick, such as DLC carbon containing 3–40% atomic % hydrogen. The hardness of this layer has been measured at greater than 10 giga-Pascals. The exact hydrogen content is dependent on the deposition method used. FIG. 1 illustrates an embodiment of the invention wherein the shaded areas 23 and 24 represent the DLC covered regions. The unshaded areas represent regions covered only by a thin residual DLC layer in the range of 0–300 Angstroms thick approximately. $L_2$ represents the overall length of the rails 18 and 20, from the ends 13 and 15 of the taper region to the trailing edge 22. $L_1$ represents the length of the DLC-covered region from the ends 13 and 15 of the taper region. In this embodiment, $L_1$ is in the range of about 10% to 70% of $L_2$, depending on the crown of the slider and the position of the load point. The taper zone may optionally contain the DLC coating as well.

FIGS. 2 and 3 show alternative configurations of the DLC coating, where in each case the shaded areas represent the regions covered by the thicker DLC layer, which comprise 10–70% of the total air bearing surface area. In FIG. 2, the shaded areas 25 and 26 may extend from the tapers to within a few milli-inches from the trailing edge 28. Alternatively in FIG. 2 the central unshaded regions 27 of the side rails may represent areas without DLC or areas with a substantially thin layer of about 100–400 Angstroms of DLC, while the shaded regions 25 and 26 represent the DLC covered areas. In FIG. 3 the DLC covered regions 30 and 32 have angled ends. The same scheme may be implemented with negative pressure bearings, although not shown and is generally applicable to any air bearing configuration, since all sliders typically are in contact with the disk surface initially and thus are subject to undesirable stiction effects.

Figure 4:
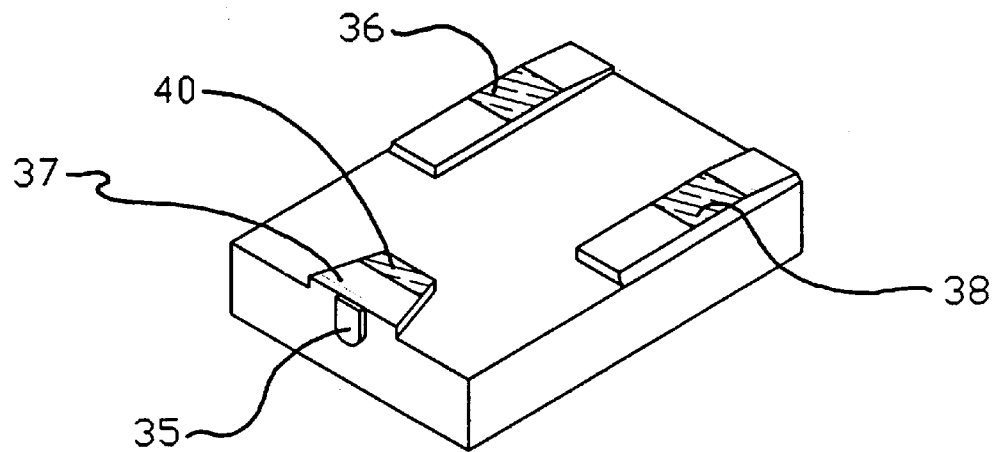
FIG. 4 is an embodiment of this invention employing a tripad slider design with three pads having portions with DLC layers thereon.

FIG. 4 shows an embodiment of the invention using a tripad design, where the deposited transducer 35 is centered on a trailing pad 37. The rectangular shaded areas 36, 38, and trapezoidal area 40 represent the thicker DLC covered regions. About 10 to 70% of the air bearing surface area is covered with DLC carbon. The unshaded regions of the two side rails may also be covered with DLC in the range of 0–400 Angstroms thickness. Other multi-rail or multi-pad devices may be similarly used.

Figure 5:
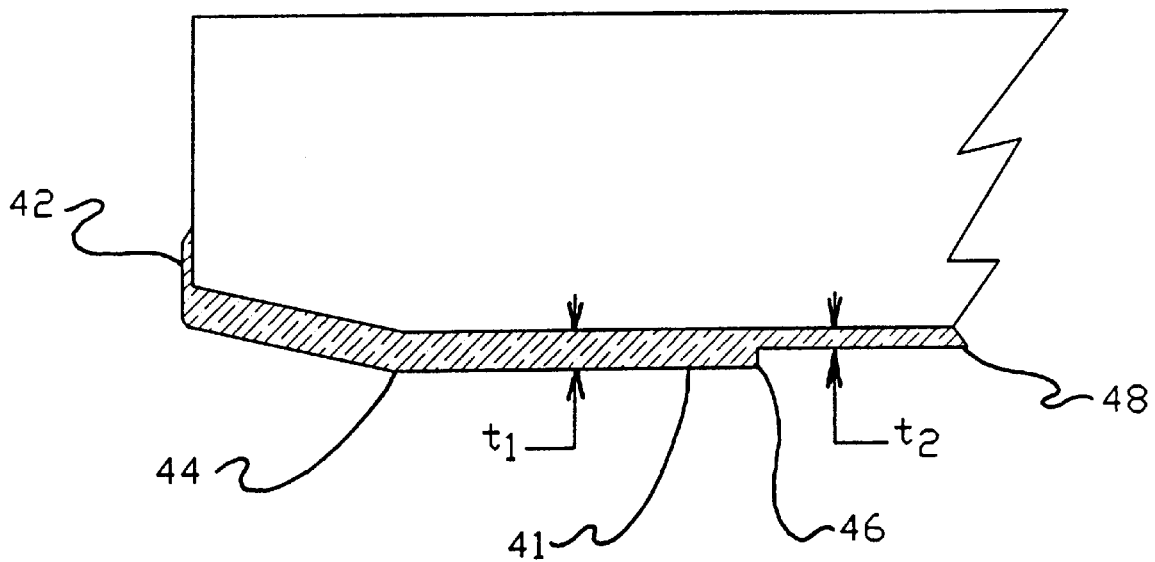
FIG. 5 is a cross-sectional side view of a preferred embodiment of this invention, showing a step in the thickness of the DLC layer.

FIG. 5 shows a cross-sectional view, in part, of an air bearing slider made in accordance with this invention. The shaded region 41 represents the DLC carbon, which is of thickness $t_1$ from the leading edge 42 to a point 46, preferably midway, between the leading edge 42 and the trailing edge end of the DLC layer 48. From point 46 to the trailing edge 48 the DLC layer is of residual thickness $t_2$ which is much less than $t_1$. In the preferred embodiment, $t_1$ is in the range of about 500 to 3000 Angstroms, and $t_2$ is in the range of about 0 to 300 Angstroms when DLC layers are used for magnetoresistive devices or other devices which require corrosion or smearing protection. For inductive heads which do not require corrosion or smearing protection, $t_2$ may be zero. A smaller thickness of the coating layer near the trailing edge allows the slider to maintain its tilt or pitch, whereby the transducers remain as close as possible to the disk. At a given pitch and specified thickness for the thicker part of the DLC, the rearmost portion of the DLC area must be spaced away from the trailing edge of the slider so that the slider clears the disk surface and does not inhibit the flying height of the slider at the trailing edge.

Stiction, friction, or wear-resistant layers are described herein as being DLC carbon. Alternatively, the layers may have other compositions, such as silicon-carbon-containing alloys and/or other hard frictioin-reducing compounds.

Deposition of these layers may utilize any method resulting in an adherent film. A seed or intermediate layer composed of silicon, silicon oxide, silicon nitride, or silicon carbide compounds may be used to ensure adhesion of the DLC or other hard layer. Typical deposition methods include sputtering (DC or RF), CVD (chemical vapor deposition), PECVD (plasma-enhanced chemical vapor deposition), laser or ion beam evaporation.

Patterning of the DLC or other wear-resistant layers can be accomplished in either of two ways. The entire air bearing surface or major portion thereof is coated by the DLC layer, followed by its controlled removal in selected regions using sputter, ion beam, or reactive ion beam etching. The thickness of the residual layer in the selected regions is then tailored to the particular application, and may range between zero to 300 Angstroms, as described with relation to FIG. 5. Alternatively, if no thin residual layer is desired, the areas to be left uncoated may be masked during deposition by proximity or contacting masks, either rigid or flexible or a two-step DLC deposition in combination with suitable masking may be used.

Stiction and friction depend on the load, the circumferential area (or footprint) which is in contact or pseudo-contact with the disk, and on other factors such as the thickness of the solid and liquid lubricant layers between the magnetic media and the air bearing slider. By covering only a fraction of the slider surface with the DLC or other wear-resistant layer, and by utilizing a step in thickness in the central region of the slider, the footprint and the areas which may be wetted by lubricant may be defined and altered. The build-up of thick layers of lubricant which tend to increase stiction can be controlled and minimized.

As a result of the above described modifications to the air bearing slider surface, stiction can be lowered to 10–20% of that seen for a typical prior art interface.

It should be understood that the invention of applying DLC to all or parts of an air bearing surface of a magnetic head slider, as disclosed herein, is not limited to any particular pattern or configuration of rails or pads or recesses formed on the air bearing surface. For example, the rails or pads may be formed with circular DLC zones or rectangular DLC zones which may be made across the length or the width of the pad or rail or angled across the length or the width of the pad or rail. The DLC zones may be straight-lined or arcuate, or of any geometry that provides an effectively operating slider.

What is claimed is:

1. An air bearing slider having an air bearing surface with a leading edge and a trailing edge and defining opposing first and second sides between said edges, said air bearing slider being spaced closely to and interfacing with a magnetic recording disk comprising:

first and second tapered regions disposed at said leading edge and adjacent to said respective first and second sides;

first and second side rails adjacent to said respective first and second tapered regions, said side rails defining a central recessed region therebetween, each of said first and second side rails further including respective first and second surfaces substantially coplanar with the air bearing surface; and a hard wear-resistant material deposited on only first and second portions of said respective first and second surfaces, wherein the area of each of said first and second portions is a fraction of the area of each of said respective first and second surfaces, the rearmost portion of said material being spaced from the trailing edge of said slider;

whereby stiction force at the slider-to-disk interface is effectively minimized while said slider maintains its tilt or pitch.

2. An air bearing slider as in claim 1, wherein said material is diamond-like carbon.

3. An air bearing slider as in claim 1, wherein said material is a silicon-carbon containing alloy.

4. An air bearing slider as in claim 1, wherein the length of each of said portions is less than half the length of each of said respective side rails.

5. An air bearing slider as in claim 1, wherein said portions of said side rails include an angled area.

6. An air bearing slider as in claim 1, wherein said material comprises a first layer of a first thickness extending from said leading edge along each of said first and second surfaces to approximately midway between said leading edge and said trailing edge, and a second layer having less thickness than the thickness of said first layer and extending from said midway along each of said first and second surfaces to said trailing edge.

7. An air bearing slider as in claim 6, wherein said first thickness of said first layer is about 500–3000 Angstroms and said thickness of said second layer is about 100–300 Angstroms.

8. An air bearing slider as in claim 1, wherein said first and second side rails are rectangular pads that extend partly from said tapered regions toward said trailing edge, and including a third pad located substantially centrally at said trailing edge, said third pad being trapezoidal.

9. An air bearing slider as in claim 8, wherein said third pad includes a third surface substantially coplanar with the air bearing surface, and wherein said material is disposed over a portion of said third pad, said portion of said third pad being spaced from said trailing edge.

10. An air bearing slider for a thin film magnetic head supported above a magnetic recording disk, having an air bearing surface with a leading edge and a trailing edge comprising:

at least first and second tapered portions at its leading edge and first and second side rails extending respectively from said tapered portions only part way to said trailing edge of said slider, and a central recessed section between said side rails;

a layer of hard wear-resistant material deposited over a defined portion of said side rails, said defined portion being deposited over 10–70% of the length of said side rails; and a thin residual layer of hard wear-resistant material over substantially the remainder of the air bearing surface of said slider;

so that stiction forces between said slider and said magnetic recording disk are minimized.

11. An air bearing slider as in claim 10, wherein said material is diamond-like carbon.

12. An air bearing slider having an air bearing surface with a leading edge and a trailing edge and defining opposing first and second sides between said edges, said air bearing slider being spaced closely to and interfacing with a magnetic recording disk comprising:

first and second tapered regions disposed at said leading edge and adjacent to said respective first and second sides;

a configuration of rails or pads having surfaces subsatntially coplanar with the air bearing surface, and recessed regions adjacent to said rails or pads; and a hard wear-resistant material deposited on only a portion of said surfaces of said rails or pads, the area of said portion being a fraction of the total area of said surfaces of said side rails and/or pads, whereby stiction force at the slider-to-disk interface is effectively minimized.

13. An air bearing slider as in claim 12, wherein said material is diamond-like carbon.

14. An air bearing slider formed with a leading edge and a trailing edge and having an air bearing surface for cooperation with and interfacing with a rotating disk comprising:

a plurality of rails and/or pads having surfaces formed coplanar with said air bearing surface, said rails and/or pads providing positive pressure regions;

recessed areas disposed adjacent to said rails and/or pads for providing negative pressure regions;

said rails and/or pads and said recessed areas providing a flying height of said trailing edge of said slider relative to said disk;

said recessed areas being in the range of 100–600 microinches deep measured from said air bearing surface; and a hard wear-resistant layer deposited on only a portion of said surfaces of said rails and/or pads, the area of said portion being a fraction of the area of said surfaces of said rails and/or pads, whereby stiction force at the slider-to-disk interface is effectively minimized.

15. An air bearing slider as in claim 14, wherein said wear-resistant layer is made of diamond-like carbon.

16. An air bearing slider as in claim 14, including tapered portions formed at said leading edge of said slider.

17. An air bearing slider as in claim 14, wherein the area of said portion is from 10% to 70% of the area of said surfaces of said rails and/or pads.

* * * * *